United States Patent Office 3,229,339
Patented Jan. 18, 1966

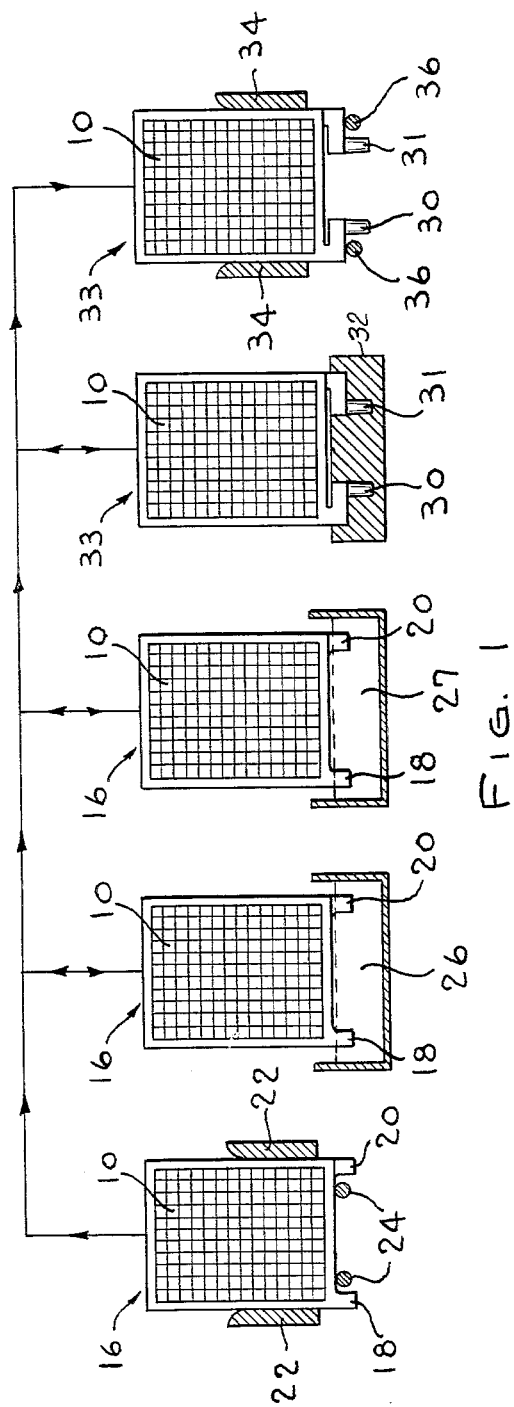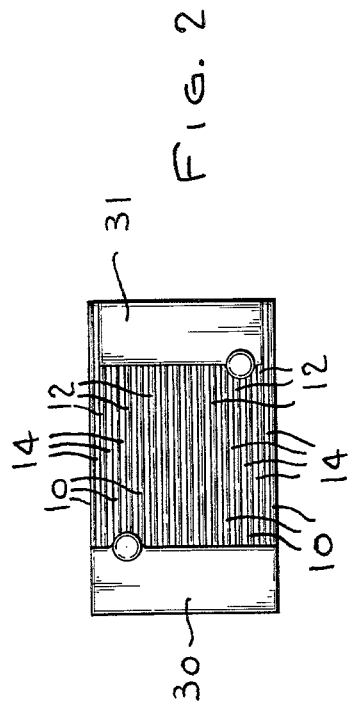

3,229,339
METHOD OF MAKING STORAGE BATTERY ELEMENTS
Anthony Sabatino and Paul V. Lowe, Milwaukee, Wis., assignors to Globe-Union Inc., Milwaukee, Wis., a corporation of Delaware
Filed Apr. 22, 1963, Ser. No. 274,441
The portion of the term of the patent subsequent to Apr. 22, 1980, has been disclaimed
15 Claims. (Cl. 22—203)

This invention relates to improvements in the method of making an element of a storage battery. More particularly it relates to a new and improved method which may be employed as an alternative to that disclosed in Serial No. 813,865, filed May 18, 1959, issued as Patent No. 3,087,005 on April 23, 1963 and Serial No. 274,442, filed April 22, 1963, both assigned to the assignee of this application.

The primary object of this invention is to provide an improved and commercially feasible "cast-on" method of making a storage battery element whereby proper fusion is regularly produced without extensive prior cleaning of the plates and/or the close maintenance of critical lead, mold and plate temperatures.

These objects are attained by first stacking a plurality of positive and negative plates in alternate relationship with suitable separators between the plates. The plates and separators of the stack are then accurately aligned with the lugs of each group of plates positioned one behind the other.

The next step involves the combined operation of applying a suitable (activated) flux to the lugs and at the same time preheating such lugs. This step is accomplished by lowering the lugs into a heated flux bath and allowing the lugs to remain therein for the period necessary to properly heat the lugs and to apply the flux thereto. The heated reactive flux applied to the lugs reduces part of the lead oxides present on the lugs to free lead and activates the lug surfaces while the heat from the hot flux bath serves to preheat the lugs.

After the flux has been applied and the lugs have been heated the fluxed lugs may be dipped into a solvent bath to remove the excess flux and flux residue.

The next step comprises the combined casting and welding operation wherein the positive and negative plate lugs are lowered into the molten lead in the respective positive and negative mold cavities. The action of the hot lead on the fluxed lugs further activates the flux reducing any oxides left on the lugs. The active surface of the lug then fuses with the molten lead and any dirt still present floats to the surface. Sound, thoroughly fused welds are thus produced with a high degree of regularity.

Other objects and advantages will be pointed out in, or be apparent from the description and claims, as will obvious modifications of the single embodiment shown in the drawings, in which:

FIG. 1 is a partially schematic flow diagram showing the various steps of the method embodying this invention; and FIG. 2 is a plan view of a finished storage battery element.

In the practice of our invention negative and positive plates 10 and 12, respectively, of conventional design are alternately arranged between suitable separators 14 to form a stack 16 with lugs 18 and 20 of the negative and positive plates, respectively, aligned with each other.

The first step after the plates and separators are properly stacked is to accurately align the stack. This can be done in any suitable manner such as that shown in the first step of the flow diagram (FIG. 1) wherein stack 16 is lowered between guides 22 (with lugs 18 and 20 extending downwardly) onto rods 24 which are then vibrated to insure proper alignment.

The next step involves the fluxing and preheating of the lugs which have been combined into a single operation. This combined fluxing and preheat step is accomplished by lowering stack 16 into a bath of heated flux 26 to the extent necessary to wet lugs 18 and 20. The hot flux at the same time serves to preheat the lugs in preparation for the combined casting and welding operation which follows.

The flux bath 26 is comprised of an organic type flux which has been heated to make the organic flux material highly reactive and to provide a source of heat for heating the lugs. While various types of organic fluxes may be used, it has been found that particularly good results are obtained by the long chain fatty acid type fluxes and the fatty ester type fluxes. Specific examples of the former which will produce the desired result are rosin, activated rosins (Kester Formula 1544 and 1015), stearic acid and oleic acid. Examples of the latter which have been used with success are lard (household grade), hydrogenated vegetable oil (household grade Crisco) and a fish oil derivative (Shell Oil Co. Pablum Oil).

Normally, suitable organic type fluxes such as those specified above are solid at room temperature and are heated to a molten state for use in the method of this invention. While the specific temperature of the heated flux will vary somewhat with the type of flux used, the production rate desired and other factors, the preferred range of flux temperatures is approximately 200–500° F. It has been found, however, that flux temperatures as low as 180° F. and as high as 600° F. could be employed with fair results. The primary considerations with respect to flux temperature range is to heat the flux to a point at which it will become reactive to a practical degree (about 180° F.) and to keep the heated flux below the point at which it will break down chemically (about 600° F.).

Specific examples of fluxes and temperature ranges employed with satisfactory results are as follows:

| Flux: | Temperature range ° F. |
|---|---|
| Lard (household grade) | 200–500 |
| Lard and rosin (mixture 75% lard and 25% rosin) | 200–500 |
| Hydrogenated vegetable oil (household grade Crisco) | 200–500 |
| Activated rosin (Kester Formula 1544 and 1015) | 200–500 |
| Fish oil derivative (Shell Oil Co. Pablum Oil) | 200–500 |

The time during which the lugs 18 and 20 are maintained in contact with the hot flux bath 26 will vary depending primarily on the temperature of the bath. Within the preferred flux temperature range (200°–500° F.), the preferred range of contact time will be approximately 10–30 seconds. It has been found, however, that when using flux temperatures at the two extremes of the practical temperature range (180°–600° F.) contact times as short as 3 seconds and as long as 5 minutes may be necessary.

The activated flux applied to the lugs reduces part of the lead oxides present on the lugs to free lead and activate the lug surfaces. The heat from the hot flux bath preheats the lugs prior to fusion with the post straps.

It should be noted at this point that in the specific flux examples outlined above the organic type fluxes used were used alone without other materials. It should be understood, however, that this invention contemplates the use of a suitable organic flux in solution in a suitable high boiling point solvent such as one of the high boiling point alcohols which solution could be heated to a temperature of about 200° F.

After the combined fluxing and heating step described above the fluxed lugs may be dipped into a solvent bath 27 to remove the excess flux and flux residue, as shown in the third step on FIG. 1. This step is not essential to the performance of the method but is advantageous depending particularly on the type of flux used. For example, when using a flux such as molten lard a somewhat sticky residue is produced, the adverse effects of which in the subsequent welding operation can be alleviated by the solvent wash step. The particular solvent 27 used will depend on the flux employed and its temperature. A solvent such as ethylene trichloride or alcohol is suitable for most of the organic type fluxes specified. The preferred time for the solvent wash is from 2 to 5 seconds, however the time can vary from 1/10th second to one minute under certain extreme conditions of lug temperature. It is recognized that the solvent wash step described above will have a tendency to cool the lugs slightly. This cooling effect, however, is relatively minor and does not materially reduce the temperature of the heated lugs.

The next step comprises the combined casting and welding operation wherein a negative post strap 30 and a positive post strap 31 are cast in a mold 32 and welded to lugs 18 and 20, respectively, of the plates. The preferred sequence for this combined operation is to first pour the lead alloy into the mold and immediately thereafter to make the welds by inserting lugs 18 and 20 of the plates into the molten lead. The flux on lugs 18 and 20 further reacts with the oxides on the lugs reducing them to free lead and the active surface of the lugs then fuses with the molten lead and any dirt still present floats to the surface. Well fused welds are thus regularly made between lugs and post straps.

While it is preferred that the pour be completed before the plates are lowered, fusion can be made by an alternative method wherein the lugs are first positioned in the mold cavities and then the molten lead is poured into the cavities around the lugs. We have found that the use of a molten lead temperature of 700°–1000° F., while maintaining a mold temperature of 150°–500° F., provides satisfactory results with either method.

The final step is the unloading of the completed element 33 from the apparatus used to perform the foregoing steps. Here again a pair of guides 34 and rods 36 can be used to support the finished element prior to unloading.

By following the steps outlined above it is possible to manufacture storage battery elements with virtually no rejects due to imperfect welds between plates and straps. This it is noted, is accomplished without extensive precleaning of the lugs and without the maintenance of critical temperature conditions. Thus, for the first time, by the use of a suitable flux as outlined above, the "cast-on" method of casting and welding post straps to the plates of a stack has been successfully put into commercial practice.

It should be noted that in the performance of each of the steps described above and illustrated in FIG. 1, the stack 16 remains in the same relative position, i.e. with lugs 18 and 20 down. Thus, it is seen that the method of this invention is particularly well adapted for performance by automatic machinery where, for example, the aligned stack could be clamped to an overhead arm and moved to successive stations for the application of flux, pre-heating, welding, and unloading.

Although but one embodiment of the present invention has been illustrated and described, it will be apparent to those skilled in the art that various changes and modifications may be made therein without departing from the spirit of the invention or from the scope of the appended claims.

We claim:
1. In the cast-on method of welding a battery plate to a battery post strap which combines the steps of casting the strap and the welding of it to the plate by bringing the plate and strap into contact with each other while the strap is in a molten state in a mold comprising the step of:
  applying a flux to that portion of the battery plate which is to be contacted by the molten lead alloy strap prior to such contact, such flux being an organic type flux which has been heated to a minimum of approximately 180° to thereby preheat said portion by the application of said heated flux.

2. In the cast-on method of welding a battery plate to a battery post strap which combines the steps of casting the strap and the welding of it to the plate by bringing the plate and strap into contact with each other while the strap is in a molten state in a mold comprising the step of:
  applying a flux to that portion of the battery plate which is to be contacted by the molten lead alloy strap prior to such contact, such flux being an organic type flux which has been heated to its molten state so that said portion will be preheated at the same time said flux is applied.

3. In the cast-on method of welding a battery plate to a battery post strap which combines the steps of casting the strap and the welding of it to the plate by bringing the plate and strap into contact with each other while the strap is in a molten state in a mold comprising the step of:
  applying a flux to that portion of the battery plate which is to be contacted by the molten lead alloy strap prior to such contact, such flux being an organic type flux in a liquid state which has been heated to a minimum of approximately 180° F. to thereby preheat said portion by the application of said heated flux, said flux being applied to said that portion of the battery plate by inserting said that portion into said liquid flux.

4. The cast-on method according to claim 3 in which the period of contact between said liquid flux and said that portion of the battery plate is within the range of approximately 3 seconds to 5 minutes.

5. The cast-on method according to claim 3 in which said flux is a long chain fatty acid type flux.

6. The cast-on method according to claim 3 in which said flux is a fatty ester type flux.

7. The cast-on method according to claim 3 in which the maximum temperature to which said flux is heated is approximately 600° F.

8. In the cast-on method of welding a battery plate to a battery post strap which combines the steps of casting the strap and the welding of it to the plate by bringing the plate and strap into contact with each other while the strap is in a molten state in a mold comprising the step of:
  applying a flux to that portion of the battery plate which is to be contacted by the molten lead alloy strap prior to such contact, such flux being an organic type flux which has been heated to a temperature within the range of approximately 200°–500° F. so that said portion will be preheated at the same time said flux is applied.

9. The cast-on method according to claim 8 in which said flux is liquid and is applied to said that portion by inserting said portion into said liquid, the period of contact between said liquid flux and said that portion of the battery plate beng within the range of approximately 10 to 30 seconds.

10. In the cast-on method of welding a battery plate to a battery post strap which combines the steps of casting the strap and the welding of it to the plate by bringing the plate and strap into contact with each other while the strap is in a molten state in a mold comprising the steps of:

applying a flux to that portion of the battery plate which is to be contacted by the molten lead alloy strap prior to such contact, such flux being an organic type flux which has been heated to a minimum of approximately 180° F. to thereby preheat said portion by the application of said heated flux, and applying a solvent to said that portion of said battery plate to remove the excess flux and flux residue therefrom.

11. The cast-on method according to claim 10 in which said solvent is applied to said that portion by inserting said that portion into said solvent, the period of time during which contact between said solvent and said that portion of the battery plate is within the range of approximately 1/10 second to one minute.

12. In the cast-on method of welding a battery plate to a battery post strap which combines the steps of casting the strap and the welding of it to the plate by bringing the plate and strap into contact with each other while the strap is in a molten state in a mold comprising the steps of:

applying a flux to that portion of the battery plate which is to be contacted by the molten lead alloy strap prior to such contact, said flux being an organic type flux in a liquid state which has been heated to a temperature within the range of approximately 180°–600° F. to thereby preheat said portion by the application of said heated flux, said flux being applied to said that portion of the battery plate by inserting said that portion into said liquid flux, the period of contact between said liquid flux and said that portion of the battery plate being within the range of approximately 3 seconds to 5 minutes; and applying a solvent to said that portion of said battery plate to remove the excess flux and flux residue therefrom, the solvent being applied by inserting said that portion into the solvent, the period of contact between the solvent and said that portion being within the range of approximately 1/10 second to one minute.

13. The cast-on method according to claim 12 wherein the temperature of the liquid flux is within the range of approximately 200°–500° F.

14. The cast-on method according to claim 12 wherein the period of contact between said liquid flux and said that portion of the battery plate is within the range of approximately 10 to 30 seconds.

15. The cast-on method according to claim 12 wherein the time of contact between said that portion of the battery plate and the solvent is within the range of approximately 2 to 5 seconds.

References Cited by the Examiner
UNITED STATES PATENTS

| | | | |
|---|---|---|---|
| 845,948 | 3/1907 | Hall | 148—25 |
| 1,188,188 | 6/1916 | Litot | 148—25 |
| 1,516,759 | 11/1924 | Woolums | 148—25 |
| 1,797,684 | 3/1931 | Handler | 22—203 |
| 1,811,292 | 6/1931 | Barhoff | 22—204 |
| 2,403,109 | 7/1946 | Miller | 29—495 |
| 2,445,431 | 7/1948 | Hill | 29—495 |
| 2,502,373 | 3/1950 | Galloway | 22—203 |
| 2,522,937 | 9/1950 | Forker | 148—25 |
| 2,774,137 | 12/1956 | Yorow | 29—495 |
| 3,072,984 | 1/1963 | Bronstert | 136—176 |
| 3,087,005 | 4/1963 | Sabatino et al. | 136—176 |
| 3,140,538 | 7/1964 | Rutledge | 29—495 |

J. SPENCER OVERHOLSER, *Primary Examiner.*

MARCUS U. LYONS, MICHAEL V. BRINDISI,
*Examiners.*

UNITED STATES PATENT OFFICE
CERTIFICATE OF CORRECTION

Patent No. 3,229,339                 January 18, 1966

Anthony Sabatino et al.

It is hereby certified that error appears in the above numbered patent requiring correction and that the said Letters Patent should read as corrected below.

Column 4, line 12, for "180°" read -- 180° F. --.

Signed and sealed this 26th day of December 1967.

(SEAL)
Attest:

Edward M. Fletcher, Jr.
Attesting Officer

EDWARD J. BRENNER
Commissioner of Patents